US012728303B2

(12) United States Patent
Camacho

(10) Patent No.: US 12,728,303 B2
(45) Date of Patent: Sep. 8, 2026

(54) AIRCRAFT OVEN WITH SAFETY OPERATION MODE

(71) Applicant: B/E AEROSPACE, INC., Winston Salem, NC (US)

(72) Inventor: Manuel Perez Camacho, Nieuwegein (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 232 days.

(21) Appl. No.: 18/402,442

(22) Filed: Jan. 2, 2024

(65) Prior Publication Data

US 2024/0325803 A1 Oct. 3, 2024

(30) Foreign Application Priority Data

Mar. 31, 2023 (EP) .................................... 23166048

(51) Int. Cl.
*A62C 3/08* (2006.01)
*A62C 37/40* (2006.01)

(52) U.S. Cl.
CPC ................ *A62C 3/08* (2013.01); *A62C 37/40* (2013.01)

(58) Field of Classification Search
CPC .. A62C 3/08; A62C 37/40; A62C 3/16; B64D 2013/0629; B64D 11/04; B64D 11/0007; B64D 2045/009
See application file for complete search history.

(56) References Cited

U.S. PATENT DOCUMENTS

| | | | | |
|---|---|---|---|---|
| 9,339,671 | B1 * | 5/2016 | Raj | A62C 13/78 |
| 10,201,722 | B2 | 2/2019 | Koreis et al. | |
| 2014/0209331 | A1 * | 7/2014 | Burkett | A62C 8/06 169/46 |
| 2014/0209332 | A1 | 7/2014 | Burkett | |
| 2017/0361139 | A1 | 12/2017 | Koreis et al. | |
| 2021/0379432 | A1 | 12/2021 | Muin et al. | |
| 2022/0212801 | A1 | 7/2022 | Bradshaw et al. | |

FOREIGN PATENT DOCUMENTS

| | | | | |
|---|---|---|---|---|
| CN | 114173887 A * | 3/2022 | A62C 31/05 |
| EP | 3663201 | 6/2020 | |
| EP | 4112463 | 1/2023 | |
| EP | 4112465 | 1/2023 | |
| WO | 2011056763 | 5/2011 | |

OTHER PUBLICATIONS

European Patent Office; European Search Report dated Aug. 29, 2023 in Application No. 23166048.1.

* cited by examiner

*Primary Examiner* — Qingzhang Zhou
*Assistant Examiner* — Joel Zhou
(74) *Attorney, Agent, or Firm* — SNELL & WILMER L.L.P.

(57) ABSTRACT

An aircraft oven is provided that includes an inner cavity configured to receive at least one hazardous item, an oven door. When the oven door is closed, the aircraft oven is configured to switch from a normal operation mode to a safety operation mode, in use.

13 Claims, 5 Drawing Sheets

AIRCRAFT OVEN WITH SAFETY OPERATION MODE

CROSS-REFERENCE TO RELATED APPLICATIONS

This application claims priority to, and the benefit of, European Patent Application No. EP23166048.1, filed Mar. 31, 2023 and titled "AIRCRAFT OVEN WITH SAFETY OPERATION MODE," which is incorporated by reference herein in its entirety for all purposes.

FIELD

The present disclosure relates to an aircraft oven with a safety operation mode for use on an aircraft.

BACKGROUND

Passengers travelling in aircraft often carry, and use, portable electronics in flight. Additionally, aircraft include potentially hazardous items that could cause a fire within the aircraft cabin. In rare instances, batteries in the portable electronics or hazardous items may overheat and cause a fire. Fumes, smoke and/or fire accidents are the most severe incidents that can happen inside an aircraft and can lead to catastrophic loss of the aircraft in a very short period of time. Due to increasing demand of portable electronics, and other dangerous goods, the risks have also increased rapidly.

Portable electronic devices, for example, are allowed in the aircraft cabin and most of their batteries are highly flammable and extremely sensitive to impacts, damage and high temperatures. Thus, these goods pose a risk of uncontained thermal runaway leading to explosion, fire, and/or the release of fumes or smoke. Fumes, smoke and/or fire can usually be detected early by the cabin crew and the cabin crew can usually address these hazards with firefighting equipment. However, firefighting equipment does not necessarily address the problem of smoke and fumes. For example, fire blankets and portable fire extinguishers can be used to suffocate fire, but they cannot contain fumes or smoke, which can lead to reduced visibility, toxic fume inhalation, panic amongst passengers, etc.

Although safety boxes are available in the field for such hazardous items, they require a refit of an aircraft to provide safety boxes around the cabin. They are cumbersome to install and require space and weight allowances in an aircraft. Therefore, there is a need for an improved and more available way of containing fumes, smoke and/or fire on aircraft.

SUMMARY

In one aspect, there is provided an aircraft oven that includes an inner cavity configured to receive at least one hazardous item and an oven door. When the oven door is closed, the aircraft oven is configured to switch from a normal operation mode to a safety operation mode, in use.

The aircraft oven may further include a vent hose and a valve. Optionally, when the aircraft oven is in the safety operation mode, the control valve is closed. Preferably, the valve is permanently closed.

The aircraft oven may further include a Human Machine Interface and/or a mechanical actuator. The Human Machine Interface and/or the mechanical actuator may be configured to switch the aircraft oven from the normal operation mode to the safety operation mode, in use.

The aircraft oven may further include insulation and an airtight seal. The airtight seal may be located between the oven door and the insulation. Preferably, the oven door may include an inner door surface and the inner cavity may include an inner cavity surface. The airtight seal may be located between the inner door surface and the inner cavity surface. The inner door surface and the inner cavity surface may include a refractory or metallic material.

In another aspect, there is provided an aircraft that includes the aircraft oven described above.

In another aspect, there is provided a method for switching an aircraft oven from a normal operation mode to a safety operation mode. The method includes opening an oven door, depositing at least one hazardous item within an inner cavity of the aircraft oven, closing the oven door and locking the oven door, activating a user interface to switch from a normal operation mode to a safety operation mode.

The method may further include removing at least one meal carrier from the aircraft oven between the steps of opening the door and depositing the at least one hazardous material within the inner cavity of the aircraft oven.

The method may further include adding a fire extinguishing agent into the inner cavity between the steps of depositing the at least one hazardous material within the inner cavity of the aircraft oven. The fire extinguishing agent may be at least one of fire-extinguishing granules and/or an automatic fire extinguisher.

The method may further include closing a valve when switching from the normal operation mode to the safety operation mode. The valve may be electrically closed and/or mechanically closed.

The method may further include a warning signal provided when the aircraft oven is in the safety operation mode. Additionally, or alternatively, a status of the inner cavity may be displayed on the aircraft oven.

DETAILED DESCRIPTION

FIGS. 1A-1C and FIG. 2 show representations of ovens in accordance with the detailed description below. It is clear that the elements of the ovens have been extrapolated that are relevant to the present disclosure and that the ovens would include ordinary elements that are not shown for the specifics of the present disclosure. Such elements that are not shown, but would ordinarily be included in the aircraft ovens, are: heating elements, fan, internal circuitry etc.

Figure 1A:
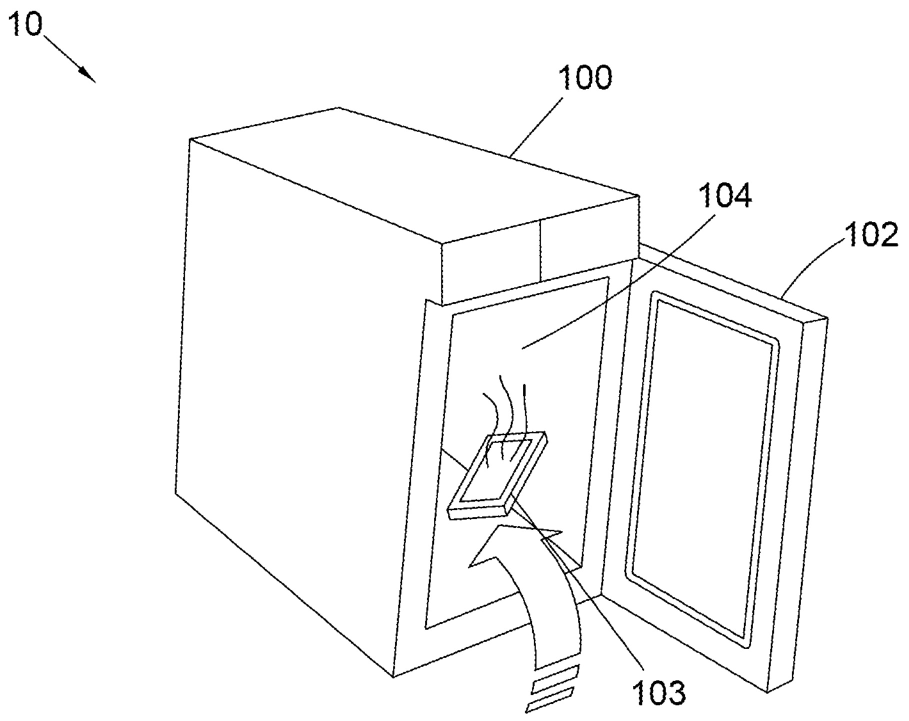
FIGS. 1A-1C show an example of an aircraft oven that includes a safety operation mode.
Figure 1B:
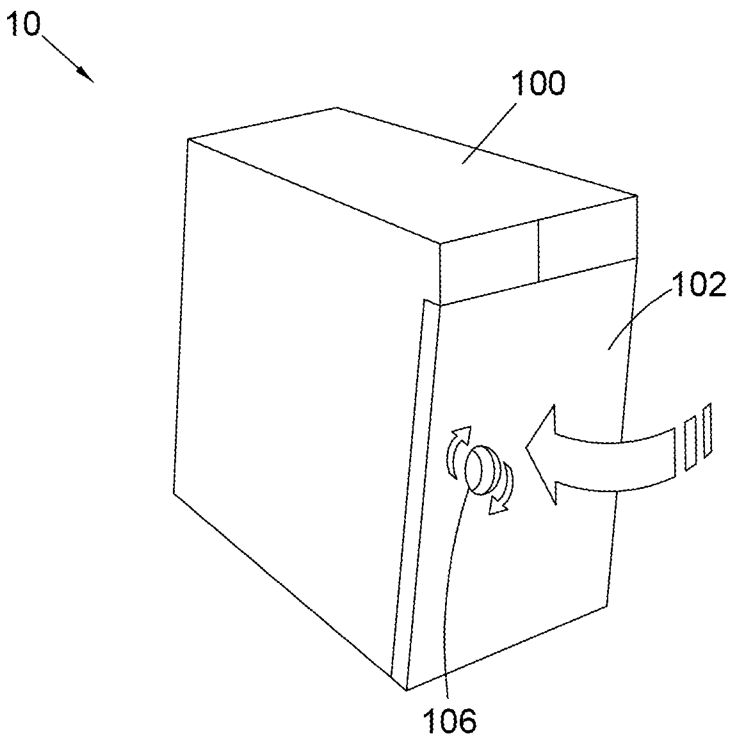
Figure 1C:
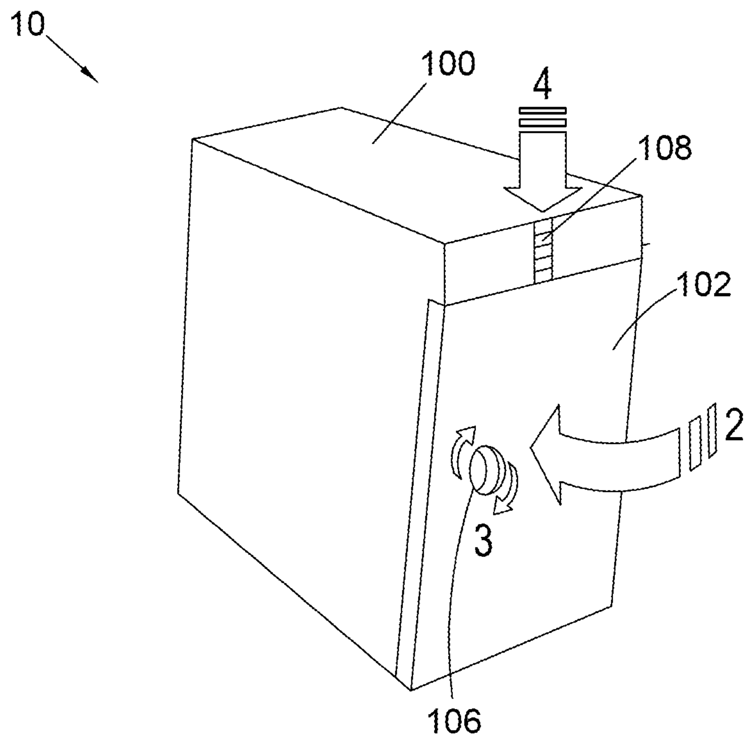

FIG. 1A-1C show an example of an aircraft oven system, shown generally as 10. As can be seen in FIG. 1A, an aircraft oven 10 includes an inner cavity 104 and a door 102. As shown in FIG. 1A, the inner cavity 104 is configured to receive at least one hazardous item (e.g. an overheating portable device, laptop, burning item etc.) 103. In FIG. 1B, it is shown that the aircraft oven door 102 may be closed and locked using a locking mechanism 106. Therefore, the at least one hazardous item 103 may be locked within the aircraft oven 100. As shown in FIG. 1C, once the aircraft oven door 102 is closed and locked via the locking mechanism 106 there may be provided a user interface 108 to allow the user to switch from a normal operation mode (i.e. when the aircraft oven 100 is in its normal operation) to a "safe box" (or safety) operation mode (i.e., when the aircraft oven 100 includes at least one hazardous item 103 and cannot be used in its normal operation). The user interface 108 may be a Human Machine Interface or an actuator lever.

FIGS. 1A-1C show a general overview of the concept of using an aircraft oven for use as in a safety operation mode. An aircraft oven, such as the aircraft oven 100 shown in these Figures may, for example, withstand extremely high temperatures and contain spillage, small bursts and/or fire that avoids quick propagation or re-ignition. However, aircraft ovens are not generally completely closed (i.e. airtight) due to, for instance, a venting hose or valve connecting the inner cavity of the aircraft oven to the back of the galley compartment for pressure release/compensation. Therefore, in the examples of this disclosure, the safety operation mode is to ensure that the aircraft oven, e.g. the aircraft oven 100, is completely closed such that no fumes, smoke and/or fire can escape the oven. Further, no fresh air will be able to enter the aircraft oven 100 to fuel or reignite the fire.

Figure 2:
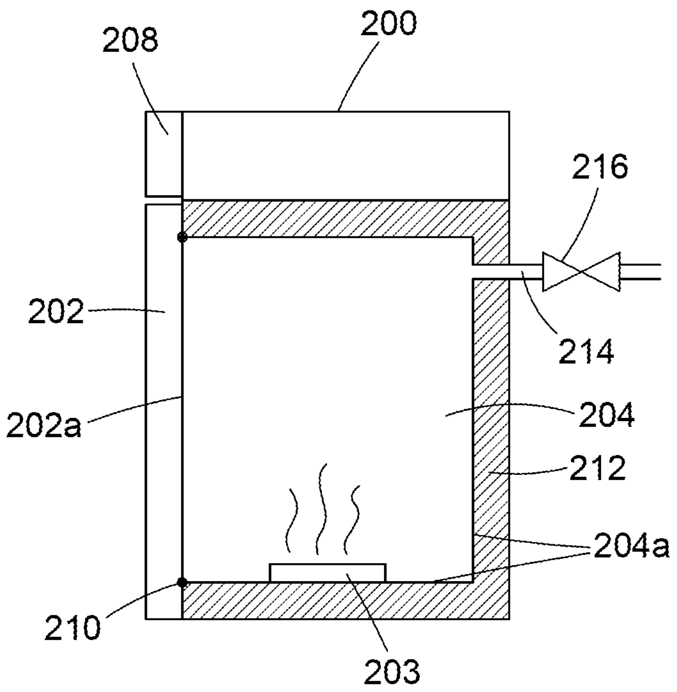
FIG. 2 shows an example of a cross-section of an aircraft oven that includes a safety operation mode.

FIG. 2 shows an example of a cross-section of an aircraft oven 200 that can be used as an example in the aircraft oven system 10 of FIGS. 1A-1C. The aircraft oven 200 may include a door 202, an inner cavity 204, insulation 212, an airtight seal 210 located between the door 202 and the insulation 212 to ensure that the inner cavity 204 is airtight, a vent hose 214 and a control valve 216. The door 202 may include an inner door surface **202*a* and the inner cavity 204 may include an inner cavity surface 204*a*. The inner door surface 202*a* and the inner cavity surface 204*a* may contain a refractory or metallic material (e.g. ceramic, polycrystalline, stainless steel, titanium or the like) that is resistant to decomposition by heat, pressure, or chemical attack and that retains strength and form at high temperatures. In this case, the airtight seal 210 is located between the inner door surface 202*a* and the inner cavity surface 204*a* to ensure that the inner cavity 204** is airtight.

In normal operation, the vent hose 214 provides fluid flow of air from the inner cavity 204. This is to ensure that the aircraft oven 200 operates as a conventional oven for cooking/warming meals and the like. The control valve 216 may operate to maintain the normal operation of the aircraft oven 200 by being in an open position such that there is fluid flow through the vent hose 214 during operation. Optionally, in a pressurized normal mode, the control valve 216 is actuated to build pressure during cooking. As shown in FIG. 2, the inner cavity 204 is configured to receive at least one hazardous item (e.g. an overheating portable device, laptop, burning item etc.) 203. When a hazardous item, e.g. 203, is located in the aircraft cabin (not shown) by the cabin crew, the at least one hazardous item 203 may be deposited into the inner cavity 204 of the aircraft oven 200. The oven door 202 may be closed and locked via a locking mechanism (not shown). When the oven door 202 is closed and locked, the airtight seal 210 ensures that the inner cavity 204 is airtight. As an example, the airtight seal 210 may be a temperature resistant seal. In the example shown in FIG. 2, the aircraft oven includes a Human Machine Interface (HMI) 208 that allows the user (e.g. cabin crew) to switch the aircraft oven 200 from a normal operation mode to a safety operation mode. It is envisaged that the HMI 208, when engaged by a user to switch from a normal operation mode to a safety operation mode, would send an electrical signal to the control valve 216 to close the valve. In some examples, the control valve 216 is permanently closed. In other words, when the safety operation mode is activated, the safety operation mode closes the control valve 216 (either permanently or temporarily) to ensure that there is no fluid or gas flow through the vent hose 214. This allows for the aircraft oven 200 to act as a 'safe box' for suffocating the fire and containing the smoke from the at least one hazardous item 203 deposited within the inner cavity 204. Although an HMI 208 is shown in FIG. 2, it is to be understood that, instead of the HMI 208, or in addition to, there may be provided a mechanical actuator (not shown) on the exterior of the aircraft oven 200 to switch the control valve 216 from an open position to a closed position, and vice versa, to move from a normal operation mode to a safety operation mode.

Figure 3:
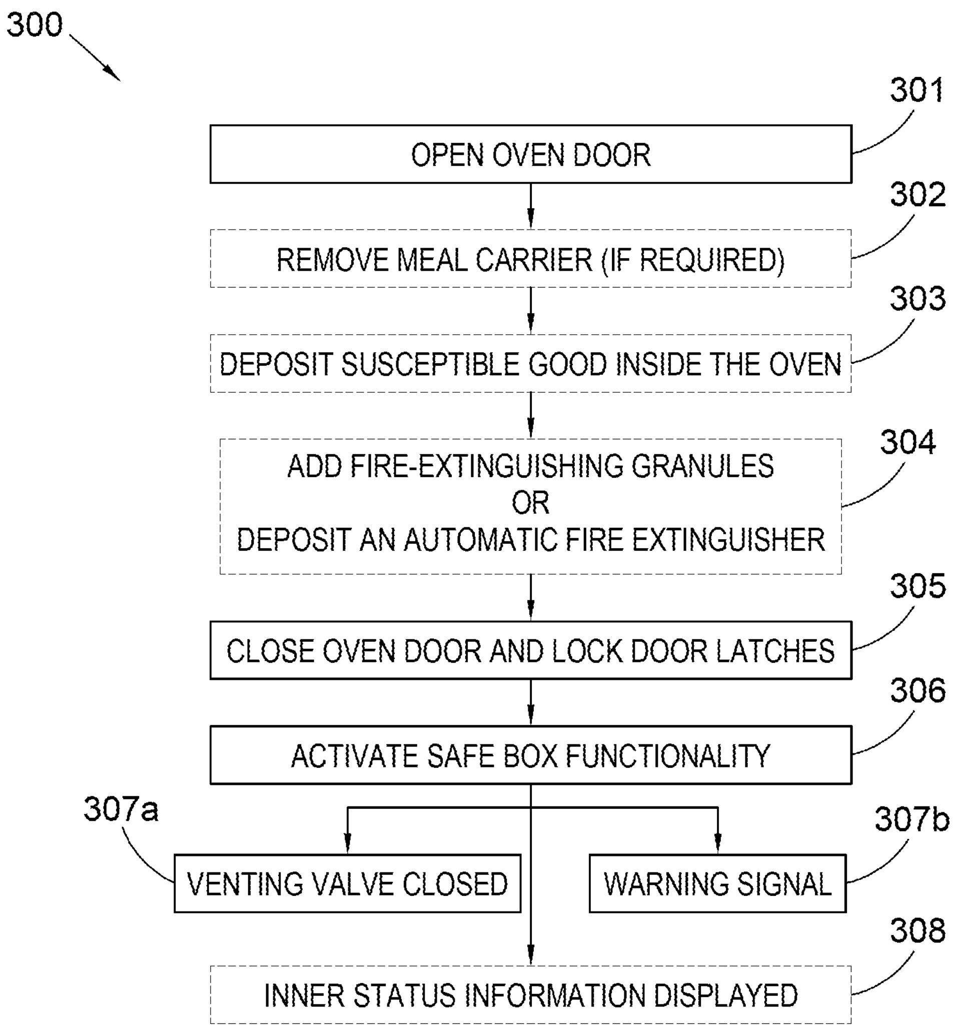
FIG. 3 shows an example method of using any of the ovens shown in FIGS. 1A-2.

FIG. 3 shows an example of a method 300 for operating any of the aircraft ovens described above (e.g., aircraft oven 100, 200). The steps shown in dotted lines in the method 300 are entirely optional. At step 301, the cabin crew, or user, can open the oven door (e.g., oven doors 102, 202). Optionally, the cabin crew, or user, can remove any meals, meal carriers, or the like from the inner cavity (e.g., inner cavity 104, 204) of the aircraft oven, if necessary. In step 303, the cabin crew, or user, deposits a good susceptible to produce heat, explode, leak, catch fire, release smoke or the like (e.g., at least one hazardous item 103, 203) inside the inner cavity of the aircraft oven. Optionally, a fire-extinguishing agent can be deposited into the inner cavity at step 304. The fire-extinguishing agent may be, as an example, fire-extinguishing granules or an automatic fire extinguisher. At step 305, the cabin crew, or user, closes the oven door and locks the oven door (e.g., via latches (not shown)). At step 306, the cabin crew, or user, activates the safe box functionality, for example by switching from a normal operation mode to a safety operation mode as described above in relation to FIG. 2. At step **307*a*, on successful activation of the safe box functionality, a venting valve (e.g., control valve 216) is closed. A warning signal is displayed on the aircraft oven at step 307*b* to notify the user that the aircraft oven is in a safety operation mode. The warning signal may be, for example, a visual and/or audible signal. Optionally, the status of the inner cavity of the aircraft oven may be displayed on the aircraft oven (e.g., on an HMI 208**).

The aircraft ovens described above make use of already existing appliances on aircraft that saves space, weight, cost and maintenance due to them already being present in aircraft galleys. Further, due to the plurality of ovens and distribution of different galleys within an aircraft, the aircraft ovens are more accessible and convenient. The hazardous items may be any item that is considered a hazard and the aircraft ovens described herein not only contain/suffocate fire but also contain fumes, smoke, bursts, chemical/liquid spills and/or overheating goods. The hazardous item may, therefore, be any product susceptible to produce heat, explode, catch fire, release fumes and/or release smoke and is certainly not limited to portable electric devices. Due to the increased volume of inner cavities of aircraft ovens, many hazardous items may be stored inside to ensure the safety of the aircraft cabin. Generally, cabin crew are aware of the location of all aircraft ovens and have ample knowledge of how to operate ovens-therefore, little training is needed to ensure that the cabin crew understand how to operate the oven from a normal operation mode to a safety operation mode.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

What is claimed is:

1. An aircraft oven comprising:

an inner cavity configured to receive at least one hazardous item, the inner cavity surrounded by insulation on a top side, a bottom side, a first lateral side, a second lateral side, and a rear side;

an oven door;

a vent hose disposed through at least one of the top side, the bottom side, the first lateral side, the second lateral side, and the rear side; and a control valve coupled to the vent hose;

wherein, when the oven door is closed, the aircraft oven is configured to switch from a normal operation mode in which the aircraft oven is operable as an oven for cooking or warming of meals to a safety operation mode, in use, wherein, when the oven door is closed, an airtight seal is formed between the insulation and the oven door, wherein, when the aircraft oven is in the normal operation mode, the control valve is configured to allow a fluid flow through the vent hose and the control valve is operable to maintain the aircraft oven as operable as the oven for the cooking or the warming of meals, and wherein, when the aircraft oven is in the safety operation mode, the control valve is closed so as to prevent the fluid flow through the vent hose.

2. The aircraft oven of claim 1, further comprising:

a Human Machine Interface and/or a mechanical actuator;

wherein the Human Machine Interface and/or the mechanical actuator is configured to switch the aircraft oven from the normal operation mode to the safety operation mode, in use.

3. The aircraft oven of claim 1, further comprising:

insulation, an airtight seal, wherein the airtight seal is located between the oven door and the insulation.

4. The aircraft oven of claim 3, wherein the oven door includes an inner door surface and wherein the inner cavity includes an inner cavity surface and wherein the airtight seal is located between the inner door surface and the inner cavity surface.

5. The aircraft oven of claim 4, wherein the inner door surface and the inner cavity surface include a refractory or metallic material.

6. An aircraft comprising the aircraft oven of claim 1.

7. A method for switching an aircraft oven from a normal operation mode to a safety operation mode, the method comprising:

opening an oven door;

depositing at least one hazardous item within an inner cavity of the aircraft oven, the inner cavity surrounded by insulation on a top side, a bottom side, a first lateral side, a second lateral side, and a rear side, wherein a vent hose is disposed through at least one of the top side, the bottom side, the first lateral side, the second lateral side, and the rear side, and wherein a control valve is coupled to the vent hose;

closing the oven door and locking the oven door;

forming an airtight seal between the insulation and the oven door;

activating a user interface to switch from a normal operation mode in which the aircraft oven is operable as an oven for cooking or warming of meals to a safety operation mode, wherein, when the aircraft oven is in the normal operation mode, the control valve is configured to allow a fluid flow through the vent hose and the control valve is operable to maintain the aircraft oven as operable as the oven for the cooking or the warming of meals, and wherein, when the aircraft oven is in the safety operation mode, the control valve is closed so as to prevent the fluid flow through the vent hose.

8. The method of claim 7, further comprising removing at least one meal carrier from the aircraft oven between the steps of opening the oven door and depositing the at least one hazardous item within the inner cavity of the aircraft oven.

9. The method of claim 7, further comprising adding a fire extinguishing agent into the inner cavity between the steps of depositing the at least one hazardous item within the inner cavity of the aircraft oven; and wherein the fire extinguishing agent is at least one of fire-extinguishing granules and/or an automatic fire extinguisher.

10. The method of claim 7, further comprising closing a valve when switching from the normal operation mode to the safety operation mode.

11. The method of claim 10, wherein the valve is electrically closed and/or mechanically closed.

12. The method of claim 7, wherein a warning signal is provided when the aircraft oven is in the safety operation mode.

13. The method of claim 7, wherein a status of the inner cavity is displayed on the aircraft oven.

* * * * *